UNITED STATES PATENT OFFICE.

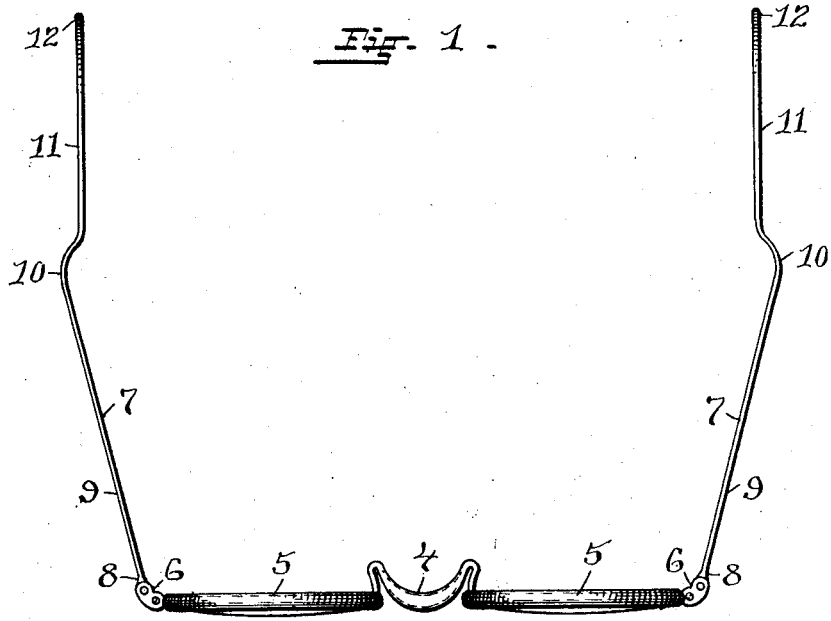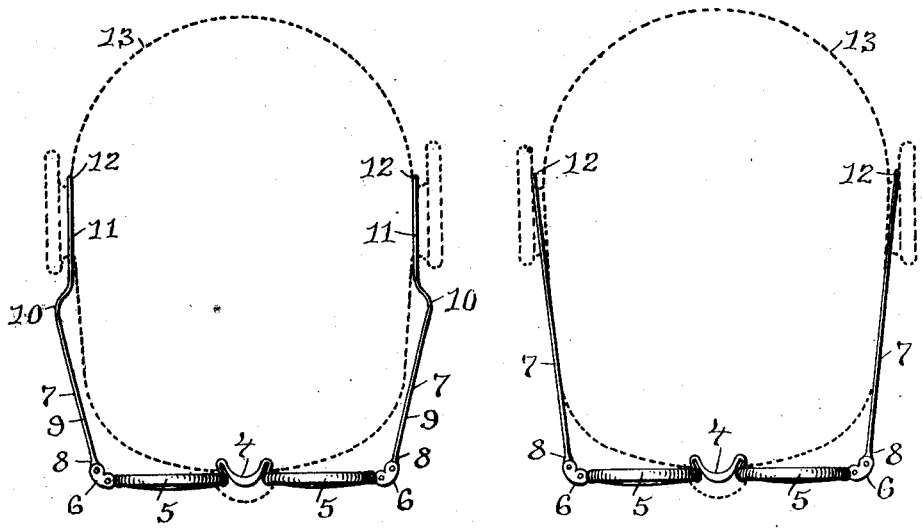

FREDERICK ARTHUR STEVENS, OF PROVIDENCE, RHODE ISLAND, ASSIGNOR TO STEVENS AND COMPANY, INCORPORATED, OF PROVIDENCE, RHODE ISLAND, A CORPORATION OF RHODE ISLAND.

OPHTHALMIC MOUNTING.

1,338,880.   Specification of Letters Patent.   Patented May 4, 1920.

Application filed August 11, 1919. Serial No. 316,790.

*To all whom it may concern:*

Be it known that I, FREDERICK ARTHUR STEVENS, a citizen of the United States, residing at Providence, in the county of Providence and State of Rhode Island, have invented a new and useful Improvement in Ophthalmic Mountings, of which the following is a specification.

My invention has reference to an improvement in ophthalmic mountings and more particularly to an improvement in the temples of spectacles and the like.

In the usual construction of spectacle temples, the temples are practically straight from the rim end pieces or temple pivots to a point over the ears of the wearer. This is detrimental as the straight temples usually bear with more or less pressure on the sides of the head and when removed leave a mark on each side of the head, and this is particularly objectionable to women, as these marks are a long time disappearing. These straight temples, when they bear on the sides of the head, are also extremely irritating and annoying to most people, particularly so if the wearer is perspiring.

The object of my invention is to improve the construction of spectacle temples, whereby the above objectionable features in spectacle temples are entirely eliminated.

My invention consists in the peculiar and novel construction of spectacle temples, whereby the temples do not touch the head of the wearer from the temple pivots to a point adjacent or over the ears, said spectacle temples having details of construction as will be more fully set forth hereinafter and claimed.

Figure 1 is a top view of a pair of spectacles provided with my improved temples.

Fig. 2 is a reduced top view in broken lines 13, of a human head, showing the spectacles in place and my improved temples out of contact with the sides of the head, from the temple pivots to a point over the ears, and the ends of the temples lying close against the sides of the head over the ears.

Fig. 3 is a view similar to Fig. 2 showing the old form of straight temples on the spectacles bearing against the side of the head and with the ends of the temples out of place over and against the back of the ears.

In the drawing 4 indicates the bridge, 5, 5 the rims having the end pieces 6, 6 to which my improved temples 7, 7 are pivotally secured in the usual way.

The temples 7, 7 are each constructed to have a pivot end 8 and a straight portion 9 which, when the temple is in the open position, is at an outward angle to the rim 5 and lies away from the side of the head. The straight portion 9 merges into an inwardly and sidewise bent portion 10 which in turn merges into a straight ear portion 11 which extends over the ear and lies lightly against the side of the head, back of the ear, as shown in Fig. 2. The free end 12 of the temple is preferably curved to fit around back of the ear, but may extend straight over the ear, if desired.

When in use, as shown in Fig. 2, the distance between the bent in sidewise portions 10, 10 being greater than the distance between the ear portions 11, 11 of the temples, allows the portions 9, 9 of the temples to stand away free from the sides of the head. The ear portions 11, 11 being at right angles to the rims 5, 5 allows the ear portions to lie flat to the sides of the head, back of the ears, in the best and most comfortable position for the wearer, thereby preventing this part of the temples from lying at an angle across the ears, and forcing the ears outward from the head, as has heretofore been done.

By the use of my improved construction in spectacle temples, all of the objectionable features in spectacle temples as heretofore described, are eliminated and a more perfect spectacle temple produced than has heretofore been done.

Having thus described my invention I claim as new:—

1. In an ophthalmic mounting, a spectacle temple having a straight portion merging into a bent in sidewise portion which in turn merges into a near portion, for the purpose as described.

2. In an ophthalmic mounting, a spectacle temple having a pivot end, an ear end and an intermediate bent in sidewise portion, for the purpose as described.

3. An ophthalmic mounting consisting of a spectacle frame, temples pivotally secured at one end to the frame, each temple having an end adapted to go over the ear and an intermediate bent in sidewise portion, whereby the distance between the bent in sidewise portions of the temples is greater than the distance between the ear portions of the temples, when the ear portion of the temples are at right angles to the frame, for the purpose as described.

4. In an ophthalmic mounting, a spectacle temple 7 having a pivot end 8, a straight portion 9, an inwardly and sidewise bent portion 10 and an ear portion 11, for the purpose as described.

In testimony whereof, I have signed my name to this specification.

FREDERICK ARTHUR STEVENS.

It is hereby certified that in Letters Patent No. 1,338,880, granted May 4, 1920, upon the application of Frederick Arthur Stevens, of Providence, Rhode Island, for an improvement in "Ophthalmic Mountings," an error appears in the printed specification requiring correction as follows: Page 1, line 96, claim 1, for the word "near" read *ear;* and that the said Letters Patent should be read with this correction therein that the same may conform to the record of the case in the Patent Office.

Signed and sealed this 22d day of June, A. D., 1920.

[SEAL.]

M. H. COULSTON,
*Acting Commissioner of Patents.*

Cl. 88—52.